(No Model.)
V. W. BLANCHARD.
GAS TRAP FOR CHIMNEYS.
No. 413,903.  Patented Oct. 29, 1889.
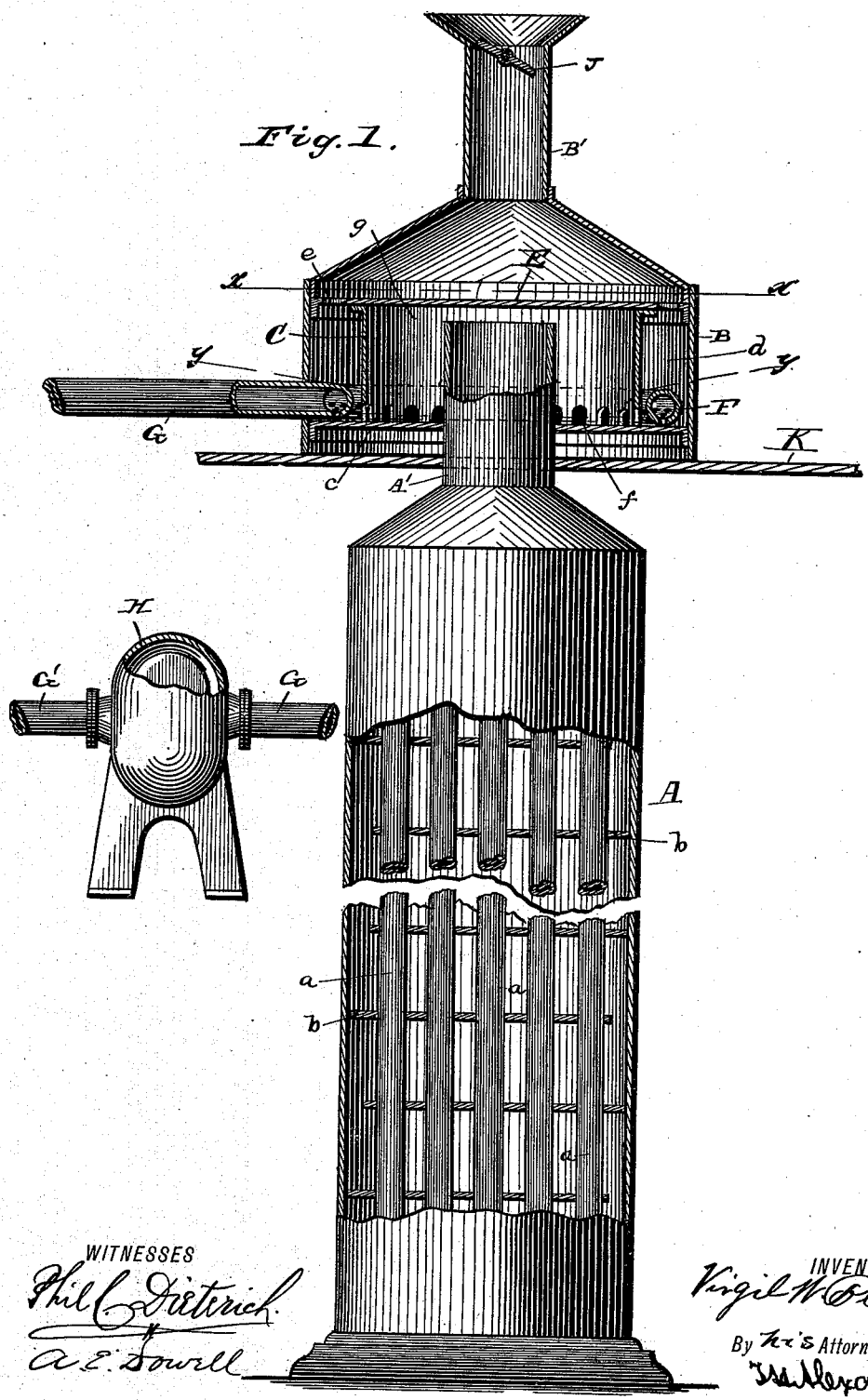

(No Model.) 2 Sheets—Sheet 2.
V. W. BLANCHARD.
GAS TRAP FOR CHIMNEYS.
No. 413,903. Patented Oct. 29, 1889.
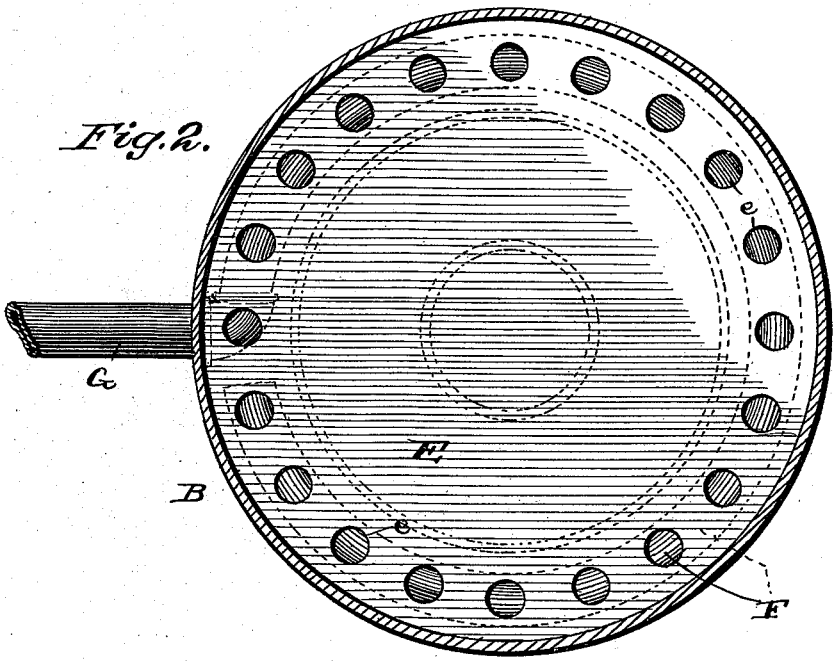
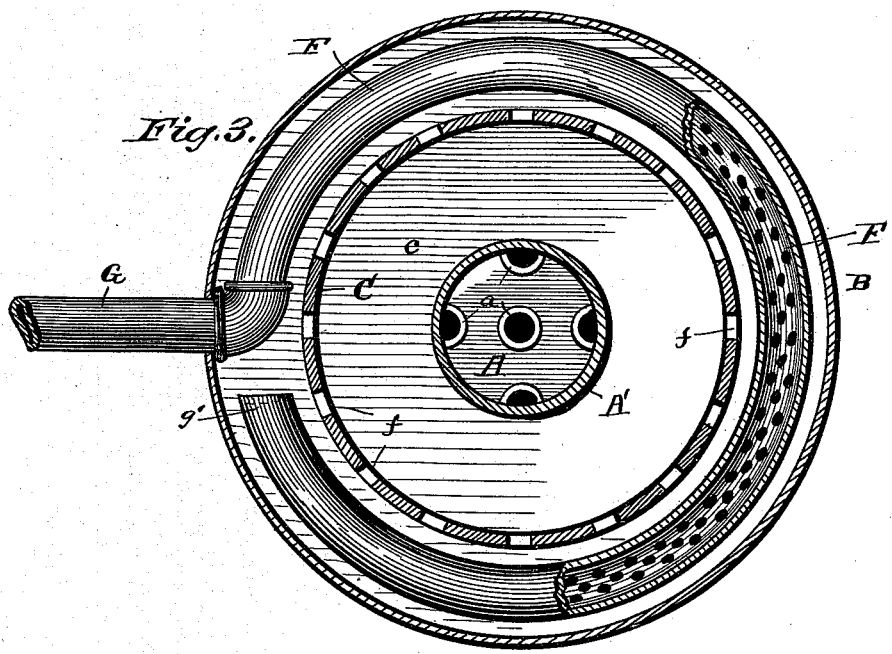
WITNESSES
Phil C. Dieterich.
A. E. Towill.
INVENTOR
Virgil W. Blanchard
By his Attorney
J. M. Alexander

UNITED STATES PATENT OFFICE.

VIRGIL W. BLANCHARD, OF NEW YORK, N. Y., ASSIGNOR TO JOSEPH A. DAVIS, OF SAME PLACE.

GAS-TRAP FOR CHIMNEYS.

SPECIFICATION forming part of Letters Patent No. 413,903, dated October 29, 1889.

Application filed April 6, 1889. Serial No. 306,202. (No model.)

*To all whom it may concern:*

Be it known that I, VIRGIL W. BLANCHARD, of New York, in the county of New York and State of New York, have invented certain new and useful Improvements in Gas-Traps for Chimneys; and I do hereby declare that the following is a full, clear, and exact description thereof, reference being had to the accompanying drawings, and to the letters of reference marked thereon, which form part of this specification, in which—

Figure 1 is an elevation showing my improved gas-trap in a vertical section applied to a chimney or uptake, and having an exhausting and forcing engine applied to a pipe leading from said trap. Fig. 2 is a horizontal section through Fig. 1, taken in the plane indicated by dotted line $x\,x$ thereon. Fig. 3 is a horizontal section taken in the plane $y\,y$ on Fig. 1.

The object of this invention is to entrap carbonic-acid gas rising through furnace-chimneys and to utilize the same for regulating the temperature of heat in furnaces, and also for other purposes where this gas can be rendered available in the arts, as will be fully understood from the following description, when taken in connection with the annexed drawings.

As my invention is applicable to my improved furnace which was secured to me by Letters Patent No. 289,963, granted December 11, 1883, as well as to other furnaces wherein it is desired to regulate the intensity of the heat by tempering the fire, I have not represented in the drawings the device applied to any furnace, as the manner of its application will be obvious to any person skilled in the art to which the invention appertains.

In the annexed drawings, A designates a chimney or uptake, which may be constructed and connected to a furnace or a flue leading therefrom in the usual well-known manner. The chimney may be provided with air-heaters, as described and shown in my aforesaid Letters Patent, or it may be constructed with a series of vertical flues $a\,a$, for the upward flight of the products of combustion, and a series of alternately-arranged horizontal diaphragms $b\,b$, which leave a descending tortuous passage for air-currents about the said flues, as shown in Fig. 1. The upper end of the chimney is contracted, as shown at A', for concentrating the waste gases as they pass off.

B designates a cylindro-conical hood, the upper end of which is contracted to form an outlet B', and through the center of the bottom $c$ of which passes the contracted outlet of the chimney A, as shown in Fig. 1. Inside of the cylindrical portion of the hood B is another cylinder C, of such diameter as to leave an annular space $d$ between the walls of the two cylinders. The top plate E of the inside cylinder C closes its upper end and forms a chamber $g$, and that portion of this plate which covers the annular space $d$ is provided with perforations $e$. Surrounding the lower part of the cylinder C are perforations $f$, outside of which, at the bottom of the space $d$, is a pipe-coil F, the lower side of which is numerously perforated. The end $g'$ of the coil F is closed and the other end communicates with a pipe G, extending to an exhausting and forcing engine or blower H, of suitable construction. From this blower H another pipe G' extends to the fire-chamber, the ash-pit, or to any other part of a furnace; or, if desired, the pipe G' may communicate with any suitable vessel adapted for receiving and holding carbonic-acid gas. The carbonic-acid gas resulting from combustion in a furnace escapes from the highest end of the chimney A into the highest part of the chamber $g$ and strikes the top plate E, from which the gas descends and passes out of the chamber $g$ into the annular space $d$. Now, as the gas in question is heavier than ammoniacal or other gases with which it may be mixed, it will fall to the lowest part of the space $d$ and be drawn therefrom through the perforations in the lower side of the pipe-coil F, from which it is drawn through pipe G and forced through pipe G' by the blower H.

In practice I shall apply a damper J in the contracted outlet B' of the gas-arresting hood or trap, although I do not consider such damper essential to the practical working of the apparatus. If desired, the trap may be supported upon a floor K, or it may be wholly sustained by the chimney.

Having described my invention, I claim as new—

1. The combination, with the escape-flue of a furnace, of a gas-trap having a receiving-chamber communicating with the flue closed at top and bottom, but open at its sides near the bottom, a gas-arresting chamber communicating with the receiving-chamber and with the outlet to the chimney, and a pipe leading from the bottom of said chamber to an exhaust and forcing engine, substantially as and for the purposes specified.

2. A carbonic-acid-gas trap for the escape-flue of a furnace, consisting of a hood, a receiving-chamber having a closed bottom, and an annular arresting-chamber outside the receiving-chamber, and a pipe leading from said arresting-chamber to an exhausting and forcing engine, substantially as described.

3. In a gas-trap constructed substantially as described, the pipe-coil having perforations in its lower side and located in the annular space $d$, in combination with an exhausting and forcing engine and the pipes thereof, substantially as described.

4. A carbonic-acid-gas trap for an escape flue or chimney, consisting of the following elements: a cylindro-conical hood, a contracted outlet therefor, an internal cylinder forming spaces $d$ $g$, outlets $f$ therefor, the perforations $e$, leading out of the space $d$, and a perforated pipe-coil communicating with a blower, all constructed and adapted to operate substantially as described.

5. The combination, with the escape-flue of a furnace, of a device having a horizontal downwardly-deflecting diaphragm, a chamber outside and below the same, outlets below the same, a suction-pipe leading from said chamber, and an exhausting-engine, substantially as and for the purposes described.

6. The combination, with a gas-trap and an escape-flue, of a perforated pipe lying in the bottom of said trap, and an exhausting-engine, substantially as and for the purposes described.

In testimony that I claim the foregoing as my own I affix my signature in presence of two witnesses.

VIRGIL W. BLANCHARD.

Witnesses:
W. R. KEYWORTH,
F. O. McCLEARY.